RECOGNITION SYSTEMS

Filed Dec. 18, 1959 9 Sheets-Sheet 1

INVENTORS
EDWARD A. QUADE
RICHARD W. WEEKS
BY Fraser and Bogucki
ATTORNEYS

*INVENTORS*
EDWARD A. QUADE
RICHARD W. WEEKS
*BY* [signature]
ATTORNEYS

*INVENTORS*
EDWARD A. QUADE
RICHARD W. WEEKS
*BY* Fraser and Bogucki
ATTORNEYS

April 30, 1968 E. A. QUADE ETAL 3,381,274

RECOGNITION SYSTEMS

Filed Dec. 18, 1959 9 Sheets-Sheet 4

INVENTORS
EDWARD A. QUADE
RICHARD W. WEEKS

BY Fraser and Bogucki

ATTORNEYS

INVENTORS
EDWARD A. QUADE
RICHARD W. WEEKS
BY
Fraser and Bogucki
ATTORNEYS

INVENTORS.
EDWARD A. QUADE
RICHARD W. WEEKS
BY Fraser and Bogucki
ATTORNEYS

INVENTORS
EDWARD A. QUADE
RICHARD W. WEEKS
BY Fraser and Bogucki
ATTORNEYS

INVENTORS
EDWARD A. QUADE
RICHARD W. WEEKS
BY Fraser and Bogucki
ATTORNEYS

INVENTORS
EDWARD A. QUADE
BY RICHARD W. WEEKS
Fraser and Bogucki
ATTORNEYS

United States Patent Office 3,381,274

Patented Apr. 30, 1968

3,381,274

RECOGNITION SYSTEMS

Edward A. Quade and Richard W. Weeks, San Jose, Calif., assignors to International Business Machines Corporation, New York, N.Y., a corporation of New York Filed Dec. 18, 1959, Ser. No. 860,471
14 Claims. (Cl. 340—146.3)

The present invention relates to recognition systems and more particularly to a new and improved system which is adapted to identify individual ones of a plurality of things by means of statistical data associated therewith.

Although many operations and manipulations are now performed automatically by means of mechanical systems, the identification of a particular one of a class of several distinctive items generally requires human recognition. For example, conventional business and scientific records as well as textual materials are usually set forth in printed or wirtten form by means of conventional letters of the alphabet, numerals and symbols each having a unique graphical configuration which the human eye recognizes by interpretation of the distinctive characteristics of each of the characters.

On the other hand, in most data processing systems, information is represented by means of coded electrical signals which in various combinations and permutations are employed to designate discrete characters or symbols comprising numerical, alphabetic or other specially identified information. Accordingly, where information is to be fed into a data processing system, it is common practice to employ a human operator who reads the graphical data and enters the information into the system by means of a keyboard or the like.

Although many systems have been proposed for generating electrical signals representing a series of unique written characters, each of the known systems suffers from disadvantages in the method and mechanism by which the analysis and recogni ion of the characters proceeds.

Accordingly, it is a principal object of the invention to provide a new and improved recognition system.

It is another object of the present invention to provide a new and improved recognition system which is capable of accurately identifying individual ones of a plurality of things.

It is still another object of the present invention to provide a new and improved character reading system in which signal information derived from the configuration of a character is analysed on the basis of statistical probability to identify the character.

It is a further object of the present invention to provide a new and improved recognition system in which an item is distinguished on the basis of a comparison of predetermined statistical probabilities with information derived from the item.

It is yet another object of the present invention to provide a new and improved recognition system in which an error signal is provided whenever the identification of a particular item may be ambiguous.

It is a still further object of the present invention to provide a new and improved recognition system in which a composite probability that a thing under analysis corresponds to a particular one of a class of things is utilized.

Briefly, in accordance with one aspect of the present invention, information is derived from a thing to be recognized, the derived information is applied to statistical comparison means, and an output signal is generated in accordance with the statistical probability that the derived information represents a particular one of a class of things which the system is capable of recognizing.

In accordance with another aspect of the invention, a recognition system is provided in which electrical signals are generated in accordance with a thing to be identified, the electrical signals are applied to a recognition circuit which passes currents in accordance with the probability that the electrical signals represent each of a plurality of separate things, and a sensing circuit is connected to receive output signals from the recognition circuit for identifying the particular thing having the highest composite probability of being correct wtih an error detection circuit being arranged to indicate the condition where the output signals representing more than one of the separate individual things fall within a predetermined range.

In one particular application of the invention, described herein by way of example, a character or symbol to be identified is scanned to develop electrical signals representing the number of intersections with a portion of the character encountered along each scanning line. The electrical signals are applied to a character recognition circuit comprising a matrix of elements having electrical characteristics corresponding to the probability that the electrical signals being generated represent each of a plurality of individual characters. By means of intergrating devices connected to the matrix, electrical output signals are derived representing the composite probability that the character being read is a particular one of the plurality of individual characters. By this means, one of the integrating devices develops an output signal which is substantially different from the others of the output signals thereby identifying the particular character being read.

In a preferred arrangement, scanning of the character takes place by means of a plurality of scanning patterns which are angularly related with the number of intersections occurring along selected scanning lines of each scanning pattern being employed to derive an electrical signal representing the number of intersections which is then applied to the matrix. The matrix may comprise a plurality of interconnected circuit elements each of which has an electrical characteristic equal to the logarithm of a predetermined probability that a particular character is being read when a given number of intersections appear along each scanning line. For example, resistance elements corresponding to each individual character may be arranged to pass current to a capacitor which develops a charge corresponding to the composite probability that the character being read is the character assigned to the capacitor. Since the charges on the capacitors each represent the composite probability that the character being read is one of a series of characters, the particular character being read may be identified through a sensing of the capacitor bearing the highest charge. The correctness of the operation of the system is established by comparing the charge on the most highly charged capacitor with others of the capacitors and where the highest charged capacitor develops a voltage which is substantially different from the voltages appearing across the other capacitors, a correct reading is indicated. In contrast, where charges on two or more of the capacitors fall within a predetermined range, an ambiguous reading is indicated.

A better understanding of the invention may be had from a reading of the following detailed description and an inspection of the drawings, in which.

Figure 1:
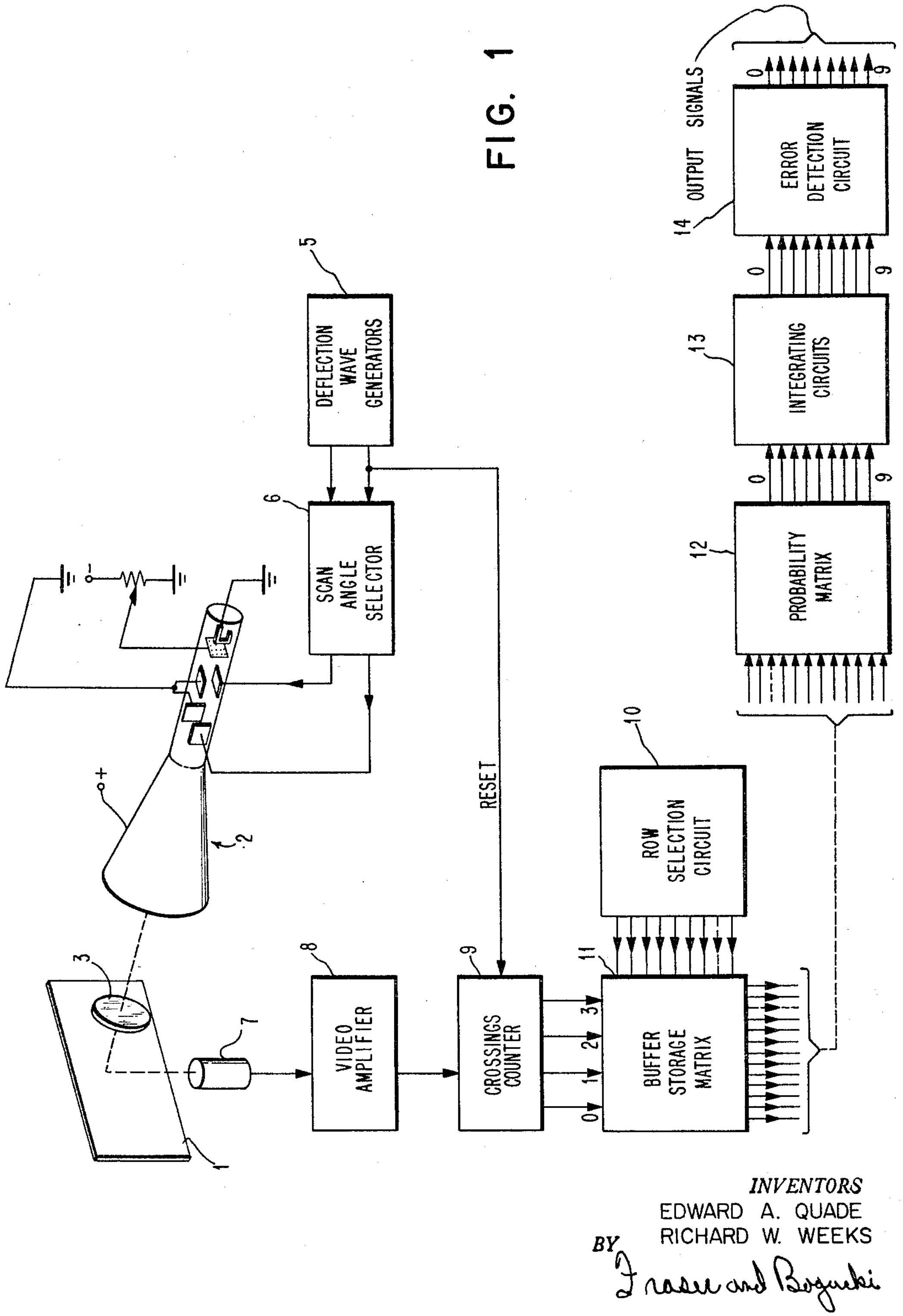
FIG. 1 is a simplified block diagram of a recognition system in accordance with the invention.
Figure 3:
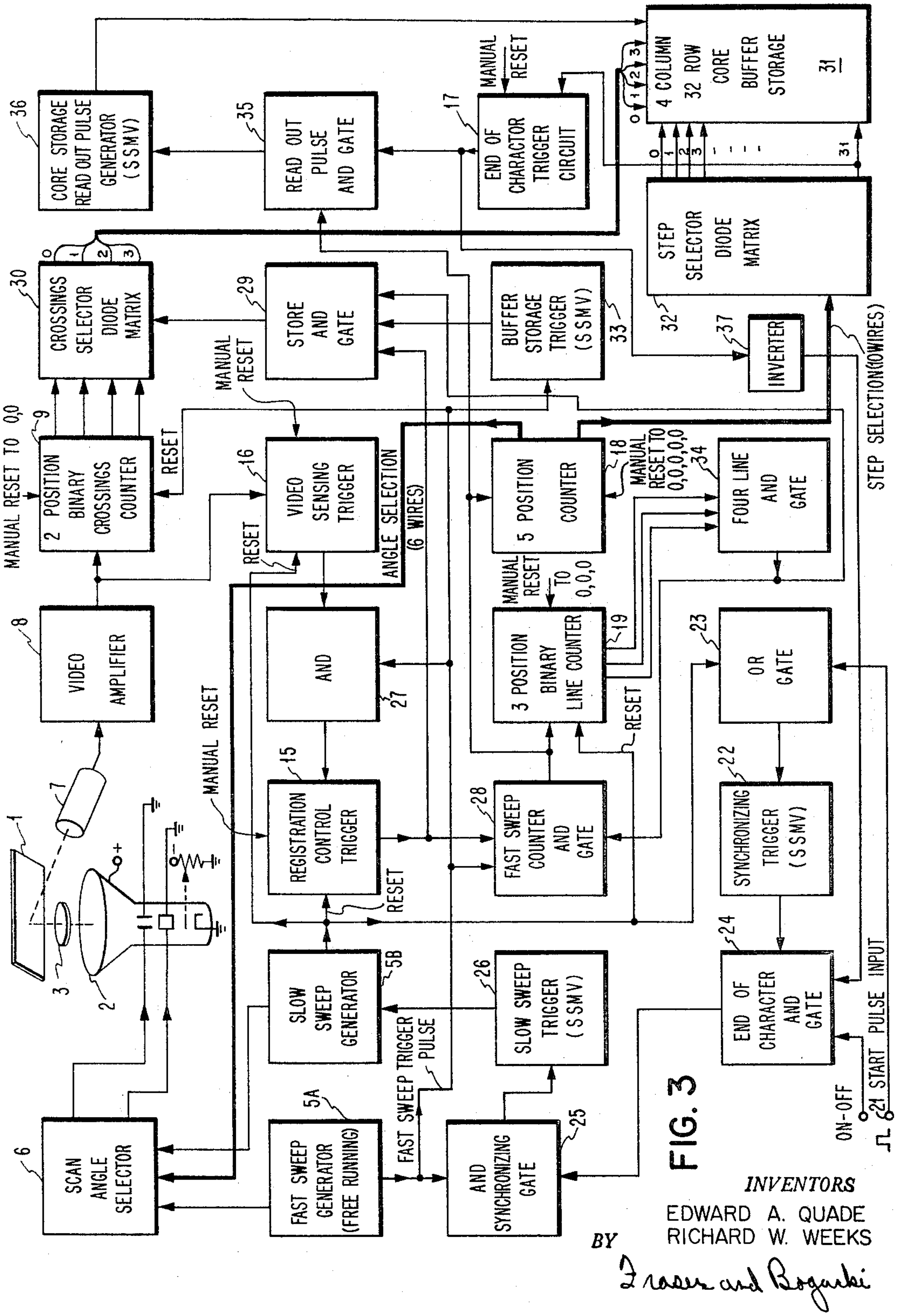
FIG. 3 is a block diagram of a portion of the arrangement of FIG. 1 illustrating the relationship between various functional elements employed in the scanning and generation of electrical signals in accordance with the invention.
Figure 4:
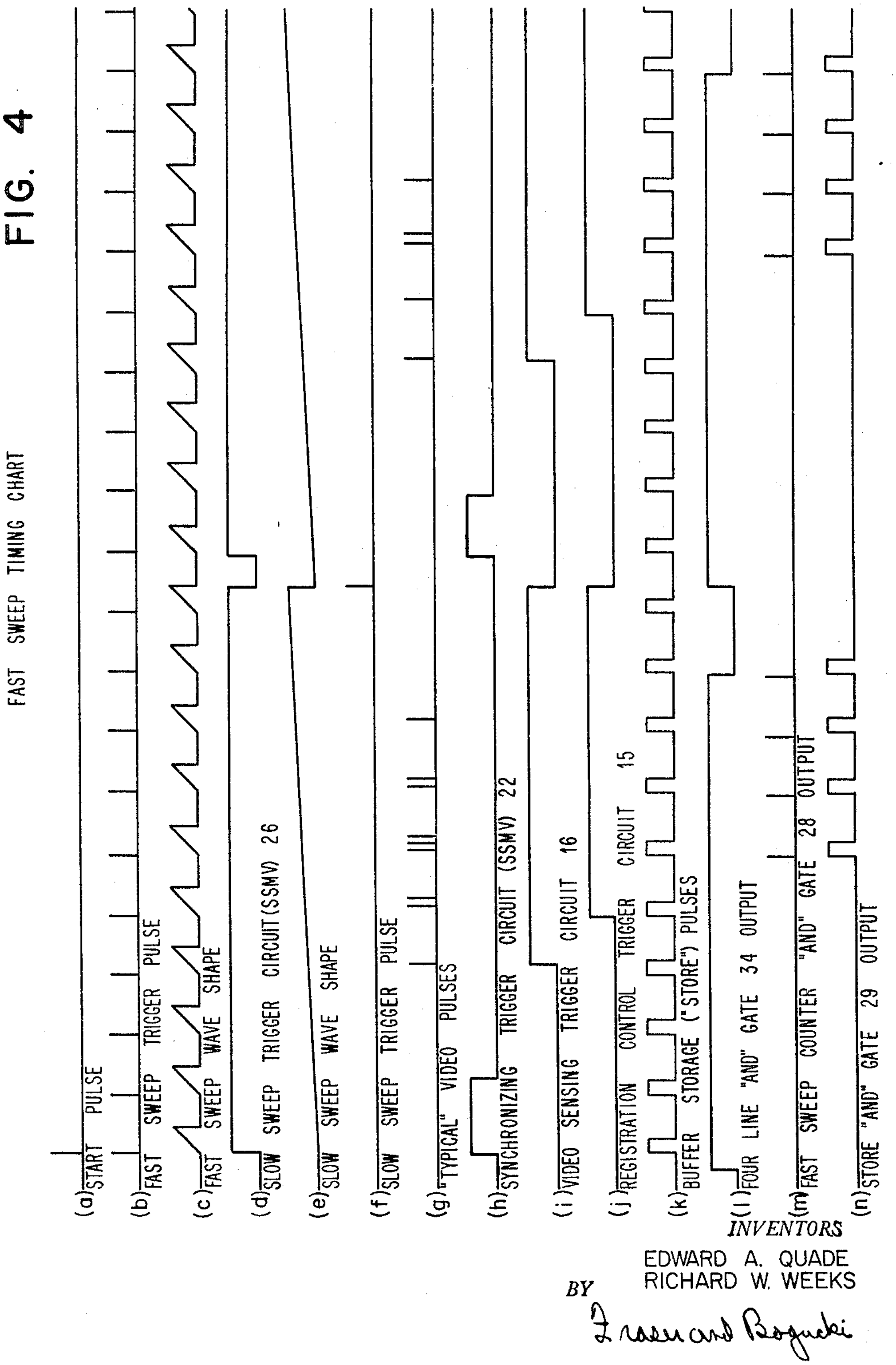
FIG. 4 is a set of graphical illustrations of various electrical signals appearing in the apparatus of FIG. 3.
Figure 6A:
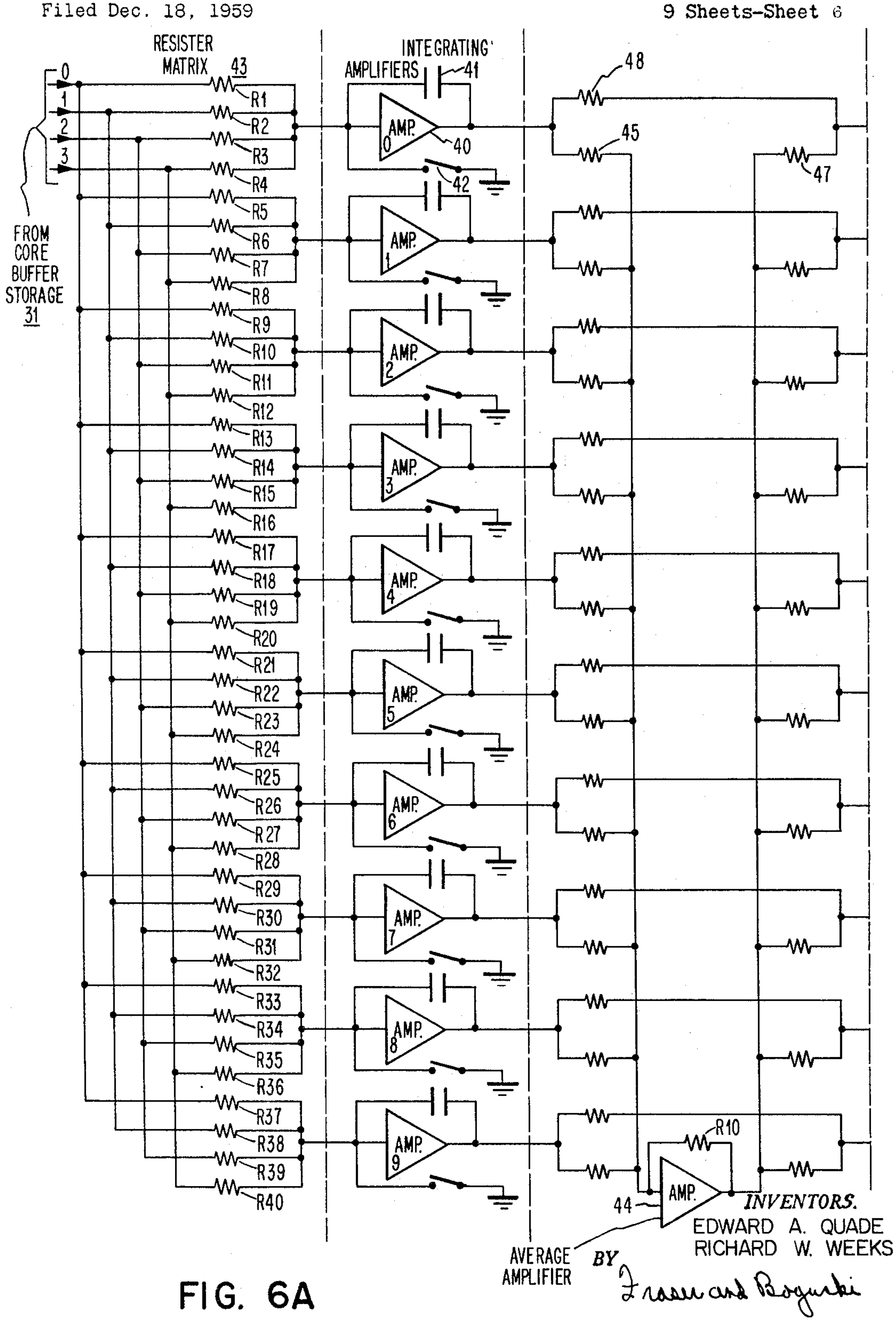
Figure 6B:
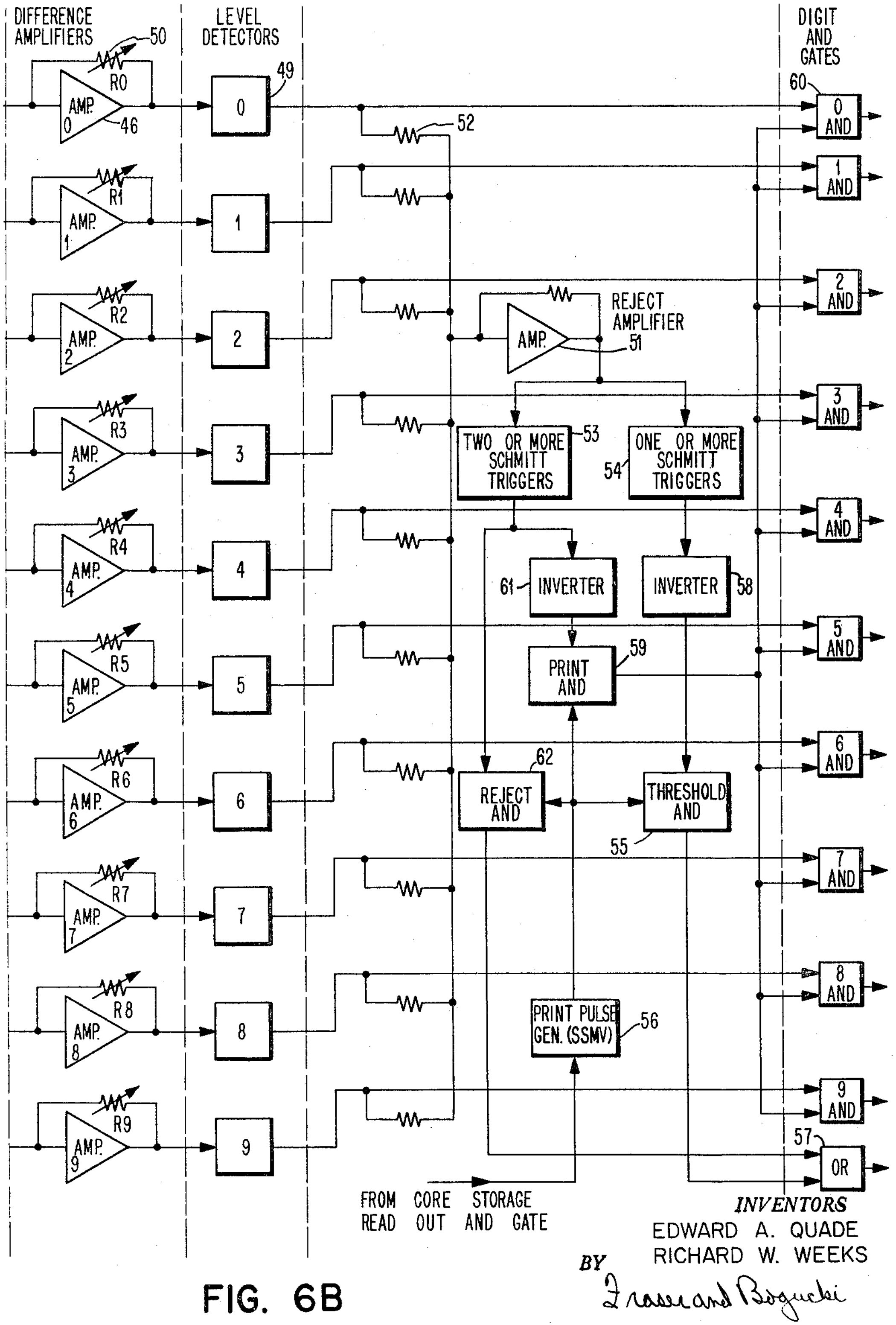
Figure 7:
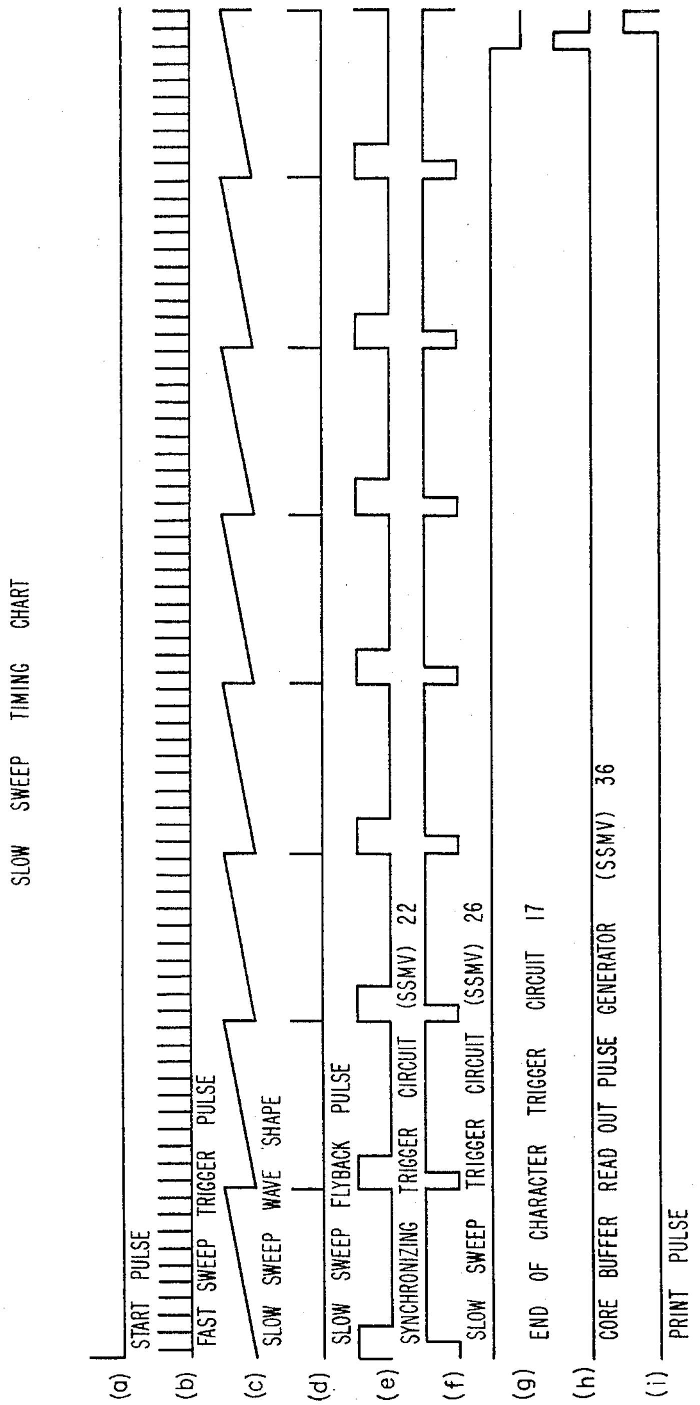
Figure 8:
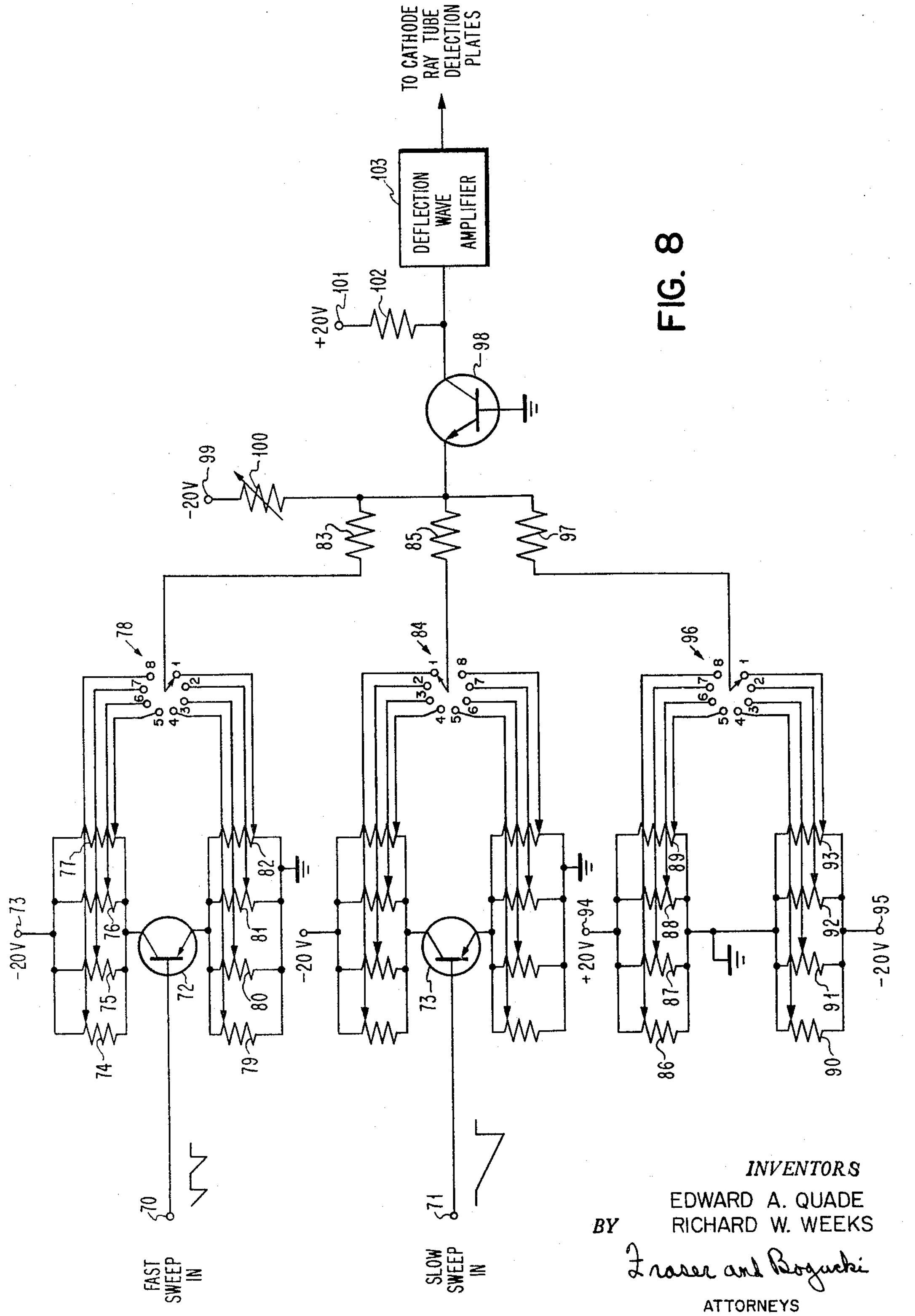

FIGS. 6A and 6B comprise together a block and schematic circuit diagram illustrating the relationship between the functional elements of a portion of a probability matrix and associated output and error sensing arrangements in accordance with the invention;

FIG. 7 is a set of graphical illustrations of various electrical signals appearing in the apparatus of both FIGS. 3 and 6; and FIG. 8 is a schematic circuit diagram of a portion of the deflection wave and scan angle control apparatus employed in the arrangements of FIGS. 1 and 4 for securing a plurality of angularly related scanning rasters.

A system in accordance with the invention may be arranged to recognize individual things which are capable of being distinguished from each other by means of statistical information derived therefrom. Accordingly, the invention is not limited to the recognition of any particular class of things, but may be readily adapted to operate upon statistical information derived from any manifestation. Thus, by way of example, graphical characters such as letters, numerals and symbols may be identified; physical shapes, patterns or configurations may be distinguished and identified, and sounds such as human voices may be differentiated one from another. Therefore, the principles of the present invention are applicable in the recognition of any phenomena from which may be derived the requisite statistical information. Accordingly, it will be understood that the particular system for the recognition of graphical characters described in detail below is intended to be by way of example only of one application of the invention to a particular problem and that by means of suitable modification, the system of the invention may be used as well for the recognition of other desired things.

Referring to the arrangement of FIG. 1, the general operation of a recognition system in accordance with the invention will be considered. In FIG. 1, graphical data in the form of characters or symbols appearing on a surface 1 is moved into a position in which each individual character may be scanned by means of a cathode ray tube flying spot scanner 2. The cathode ray tube scanner 2 operates in conventional fashion to control the movement of an electron beam which produces a moving spot of light by impinging upon a phosphor surface. An optical system illustrated diagrammatically by means of a lens 3 may be employed to focus the moving spot of light at the surface 1.

Horizontal and vertical deflection waves for controlling the movement of the spot of light may be derived from the deflection wave generators 5. By means of a scan angle selector 6 which functions to apply both horizontal and vertical deflection waves to the scanner 2 in varying relationships, a raster of scanning lines is produced which may be rotated into predetermined angular positions with respect to a fixed axis. Thus, for example, as shown in FIG. 2, eight separate scanning patterns or rasters may be generated, each of which comprises a plurality of scanning lines which proceed in a direction bearing a different angular relationship to intercept the character being scanned.

Figure 2:
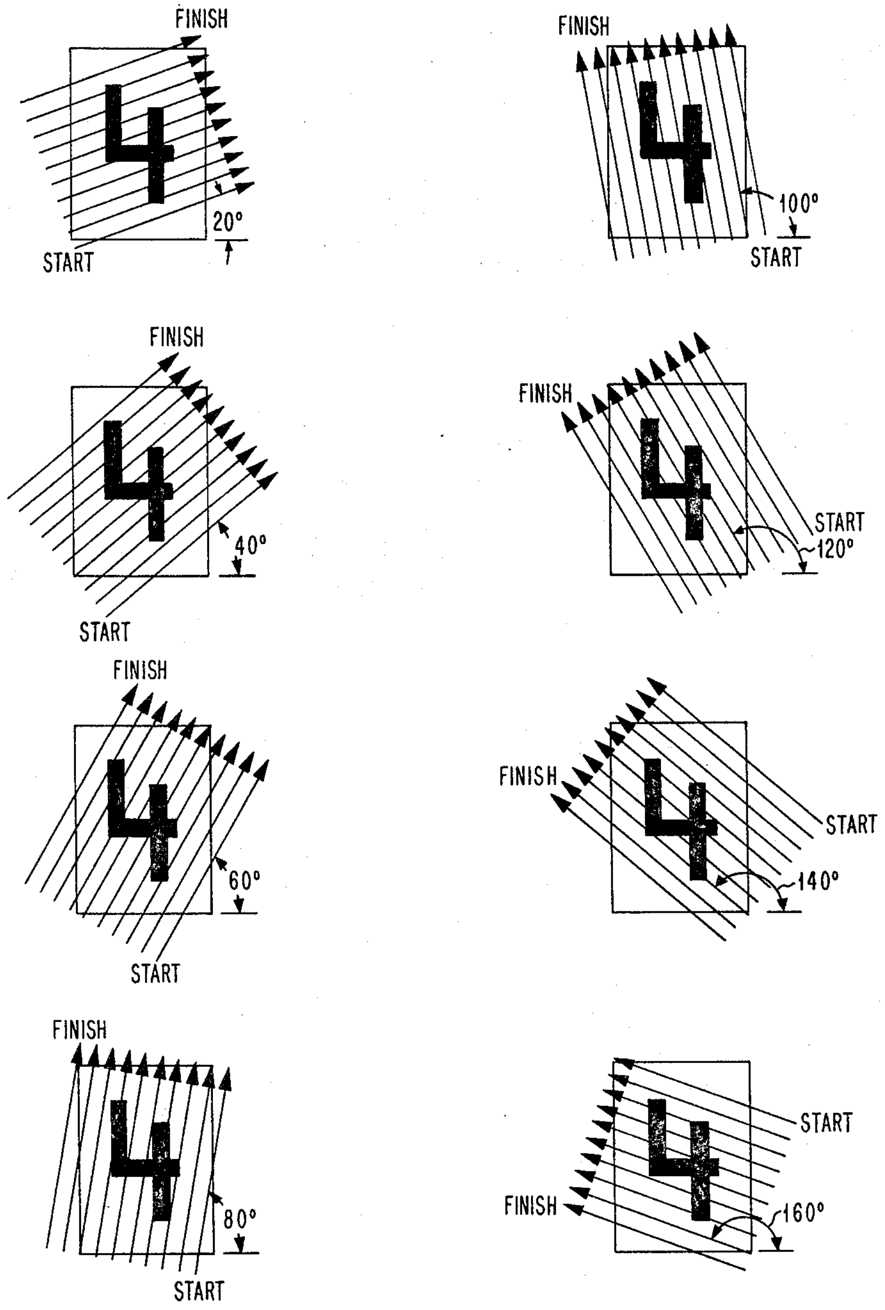
FIG. 2 is a set of diagrammatic illustrations of the manner in which a particular character may be scanned to develop electrical signals for use in the recognition system of FIG. 1.

Referring again to FIG. 1, an electrical signal is generated in response to the intersection of the character under analysis and the moving spot of light as it proceeds to trace out the scanning patterns of FIG. 2 by means of a photocell 7. That is, the photocell 7 generates an output pulse each time the moving spot traverses a portion of the outline of the character. Electrical signals from the photocell 7 may be amplified in a conventional video amplifier 8 and applied to a crossings counter 9. The crossings counter 9 is reset by the pulse associated with each scanning line so that the crossings counter 9 functions to indicate the number of intersections encountered along each scanning line. In normal character identification, no more than a total of three separate intersections are encountered along any given scanning line. Therefore, the crossings counter 9 may be arranged to develop an output signal on one of four separate leads depending upon the number of intersections encountered along each scanning line ranging from zero to three. A row selection circuit 10 functions to enable a buffer storage matrix 11 to respond to the number of intersections occurring along each one of a succession of scanning lines. The buffer storage matrix 11 may comprise a conventional core memory or the like in which row and column connections are energized to store information in digital form by means of storage elements located at the intersections between the row and column connections.

In operation, the system of FIG. 1 proceeds to execute a complete scanning cycle in which the buffer storage martix 11 registers the number of intersections between the scanning spot and the outline of the character being read along selected ones of the scanning lines of each of the several angularly related scanning rasters. Thus, at the end of the scanning cycle, the buffer storage matrix 11 contains the necessary statistical information for identification in accordance with the invention.

In order to identify which of a plurality of individual characters is represented by a particular registration of information in the buffer storage matrix 11, the information is applied to recognition circuitry comprising a probability matrix 12, integrating circuits 13 and an error detection circuit 14. The probability matrix 12 includes a plurality of interconnected elements each of which possesses an electrical characteristics corresponding to the probability that a particular number of intersections encountered along a given scanning line represents one of the individual characters which the system is capable of distinguishing. Thus, the probability matrix 12 links each of the buffer storage elements of the matrix 11 to all of a plurality of output conductors corresponding to the individual characters capable of being recognized by the system.

In one particular arrangement of the invention described in detail below, the probability matrix 12 comprises resistance elements whose conductances are selected in accordance with the logarithm of a number corresponding to the probability that a given number of crossings encountered in each selected scan represents each of the characters capable of being identified by the system. Thus, the amount of current passed by each element of the probability matrix 12 in response to a signal from the buffer storage matrix 11 is weighted in accordance with the likelihood that the electrical signal represents a particular character. The result is that current flows through each of the output conductors from the probability matrix 12 in an amount corresponding to the sum of the currents passed by individual matrix elements, thereby corresponding to the sum of the logarithms determining the value of the individual matrix elements.

For example, if in a given scanning line three intersections are encountered, a signal is applied to the probability matrix 12 from the buffer storage matrix 11 which causes current to flow through the output conductors in an amount determined by the conductances of the resistances of the probability matrix with the values of the current flow through the output conductors being weighted to favor those characters in which it is possible that the given scan might encounter three intersections.

Signals are passed through the output conductors from the probability matrix 12 in response to the registrations in the buffer storage matrix 11 in accordance with the number of intersections encountered along each scanning line so that the current flow in the aggregate through each output conductor of the probability matrix 12 represents a composite probability that the character being read is a particular one of the plurality of set of characters for which the system is designed.

The integrating circuits 13 function to accumulate the current passed by the output conductors of the probability matrix 12 so as to generate output signals corresponding to each of the composite probabilities. The result is that, on one of the output leads from the integrating circuit 13, there will appear for a correct reading operation a voltage which is substantially different from that appearing on any others of the output conductors. Accordingly, the substantially different voltage identifies the particular character being read with a high degree of reliability and precision.

Although a system in accordance with the invention is arranged to respond to variations in the representation of a particular character as produced by variations in handwriting, printing or type style, it is possible that in some instances an ambiguity may result through the inability of the system to establish a composite probability output signal which differs substantially from the other composite probability output signals so as to identify the particular one of the set of symbols with assurance. In order to overcome this problem the error detection circuit 14 functions to sense that condition where the composite probability signals from the integrating circuits 13 fall within a predetermined range which indicates that the particular character being read cannot be identified with sufficient certainty. The error detection circuits may be arranged to provide a separate error or reject signal, to sound an alarm, or to cause the system to pause for further instructions if desired. The result is that at the output of the error detection circuit 14 there appears an electrical signal which identifies the character or symbol being read by the character recognition system from the surface 1. By advancing successive characters in position for scanning by the flying spot scanner 2, the apparatus of FIG. 1 may be employed successively to generate electrical output signals suitable for entry into a data processing system as well as for other purposes.

In FIG. 3 of the drawings there is illustrated an arrangement for performing the functions of a portion of the system of FIG. 1 corresponding to the scanning, crossings counting and buffer storage components, along with various control circuitry which operates to perform the aforesaid functions in the proper sequence. Like reference numerals have been employed in FIG. 3 to designate components corresponding to those illustrated in FIG. 1. Accordingly, deflection waves derived from a fast sweep generator 5A and a slow sweep generator 5B are applied to a cathode ray tube flying spot scanner 2 via a scan angle selector 6 so that there is produced a raster of scanning lines focused by a lens 3 upon a character bearing surface 1. A photocell 7 produces electrical signals corresponding to each intersection of a scanning line with a character on the surface 1, with the electrical signals from the photocell 7 being amplified and shaped by means of a video amplifier 8. Signals appearing at the output of the video amplifier 8 are applied to a two position binary crossings counter 9 which generates a combination of output signals corresponding to the number of intersections encountered along each scanning line.

Before the scanning of a particular character on the surface 1 commences, several of the components of the arrangement of FIG. 3 are reset either manually or automatically by applying suitable reset pulses to the reset connections as indicated in the drawing. Thus, a bistable registration control trigger circuit 15 is placed in its stable condition in which a low valued output signal is provided, the two position binary crossings counter 9 is reset to its 0,0 condition, a bistable video sensing trigger circuit 16 is set to a condition in which a low valued output signal is provided, a bistable end of character trigger circuit 17 is set to a condition in which a low valued output signal is provided, a five position binary step counter 18 is set to its 0,0,0,0,0 condition and a three position binary line counter 19 is reset to its 0,0,0 condition.

In order to initiate the operation, a start pulse as shown in FIG. 4(*a*) is applied to a terminal 21 from which the pulse is passed to a synchronizing trigger circuit 22 via an "OR" gate 23. The synchronizing trigger 22 may comprise a single shot multivibrator (SSMV) which provides an output pulse that is slightly longer than the period of the fast sweep as shown in FIG. 4(*h*) in response to each pulse passed by the "OR" gate 23. The output pulse from the synchronizing trigger 22 is passed by an end of character "AND" gate 24 to condition an "AND" synchronizing gate 25 so that the next succeeding fast sweep trigger pulse derived from the fast sweep generator 5A is applied to a slow sweep trigger circuit 26 (SSMV).

The fast sweep generator 5A may include a free-running blocking oscillator which produces fast sweep trigger pulses as shown in FIG. 4(*b*) for initiating the sawtooth waveform of FIG. 4(*c*) which may be applied to the scan angle selector 6 as a deflection wave. The fast sweep trigger pulses are applied to the "AND" synchronizing gate 25 which passes a selected one of the pulses to the slow sweep trigger circuit 26 whenever the "AND" synchronizing gate 25 is conditioned by a signal from the end of character "AND" gate 24. Thus, an extended length pulse as shown in FIG. 4(*d*) is applied to the slow sweep generator 5B which in turn generates a sawtooth deflection wave as shown in FIG. 4(*e*), in addition to the slow sweep flyback pulse as shown in FIG. 4(*f*) for application to other components of the system as described below.

The deflection wave from the slow sweep generator 5B is applied to the scan angle selector 6 along with the deflection wave from the fast sweep generator 5A and the scan angle selector 6 functions to combine the two deflection waves for application to the cathode ray tube scanner 2 in order to produce scanning rasters which may be rotated in predetermined angular position with respect to a fixed axis.

In operation, the cathode ray tube scanner 2 generates a flying spot of light which follows successive lines of a scanning raster under the control of the deflection waves generated by the fast and slow sweep generators 5A and 5B. Within a single scanning raster, the scanning of successive lines proceeds until the flying spot of light first intersects a portion of a character on the surface 1. When the light spot crosses the character, the photocell 7 emits a pulse which is amplified and passed by the video amplifier 8. This first video pulse sets the video sensing trigger circuit 16 and is counted by the crossings counter 9. The video sensing trigger 16 when set by the video pulse conditions an "AND" gate 27 so that the next occurring fast sweep trigger pulse sets the registration control trigger circuit 15. When set by the pulse from the "AND" circuit 27, the registration control trigger circuit 15 conditions a fast sweep counter "AND" gate 28 as well as a store "AND" gate 29. Typical video output pulses from the video amplifier and shaper 8 are shown in FIG. 4(*g*) with the output signals from the video sensing trigger 16 and the registration control trigger 15 being shown respectively in FIGS. 4(*i*) and 4(*j*).

The number of intersections between the flying spot and a character on the surface 1 encountered during each fast sweep is stored in the two position binary crossings counter 9 until the following fast sweep trigger pulse occurs which functions to reset the crossings counter 9 to the 0,0 position. A crossings selector diode matrix 30 converts the binary coded signals from the crossings counter 9 into a one out of four code in which a signal appears on one of four output leads depending upon the number of crossings encountered. Thus, the output of the crossings selector diode matrix 30 may indicate that no intersections were encountered or that one, two or three intersections were encountered. The crossings signal from the matrix 30 is stored in a core buffer storage matrix 31 which may comprise, for example, a matrix of magnetic core elements arranged in four columns and 32 rows with an individual core element being located at the intersection of each of the row and column connections. The information appearing at the output of the crossings selector diode matrix 30 is entered into the core buffer storage 31 for the four scanning lines immediately following the setting of the registration control trigger 15. That is, as soon as one of the scanning lines of the scanning raster intersects a character, the registration control trigger 15 is set and the number of intersections encountered on each of the following successive scanning lines is entered into the core buffer storage 31 until the information derived from four successive scanning lines has been registered.

In response to each fast sweep trigger pulse a buffer storage trigger (SSMV) 33 generates a store pulse as shown in FIG. 4(*k*) which is passed by the store "AND" gate 29 to the crossings selector diode matrix 30, which in turn passes a pulse on one of the four output leads to the core buffer storage 31. The entry of the information in the core buffer storage 31 is under the control of a step selector diode matrix 32 which functions to sequentially energize each of 32 row connections of the core buffer storage unit 31 so that the information from the crossings selector diode matrix 30 is registered by a selected one of four core elements in each row. The five position binary step counter 18 receives fast sweep flyback pulses via the "AND" gate 28. As the counter 18 is stepped from position to position, the diode matrix 32 functions in response to output signals from the counter 18 to sequentially energize each of the row connections. A total of 10 leads between the counter 18 and the matrix 32 pass binary coded signals corresponding to the position of the counter 18 and the diode matrix 32 functions in conventional fashion to convert the binary coded signals to a one out of thirty-two code so that one and only one of the 32 row connections is energized at a time.

Figure 5:
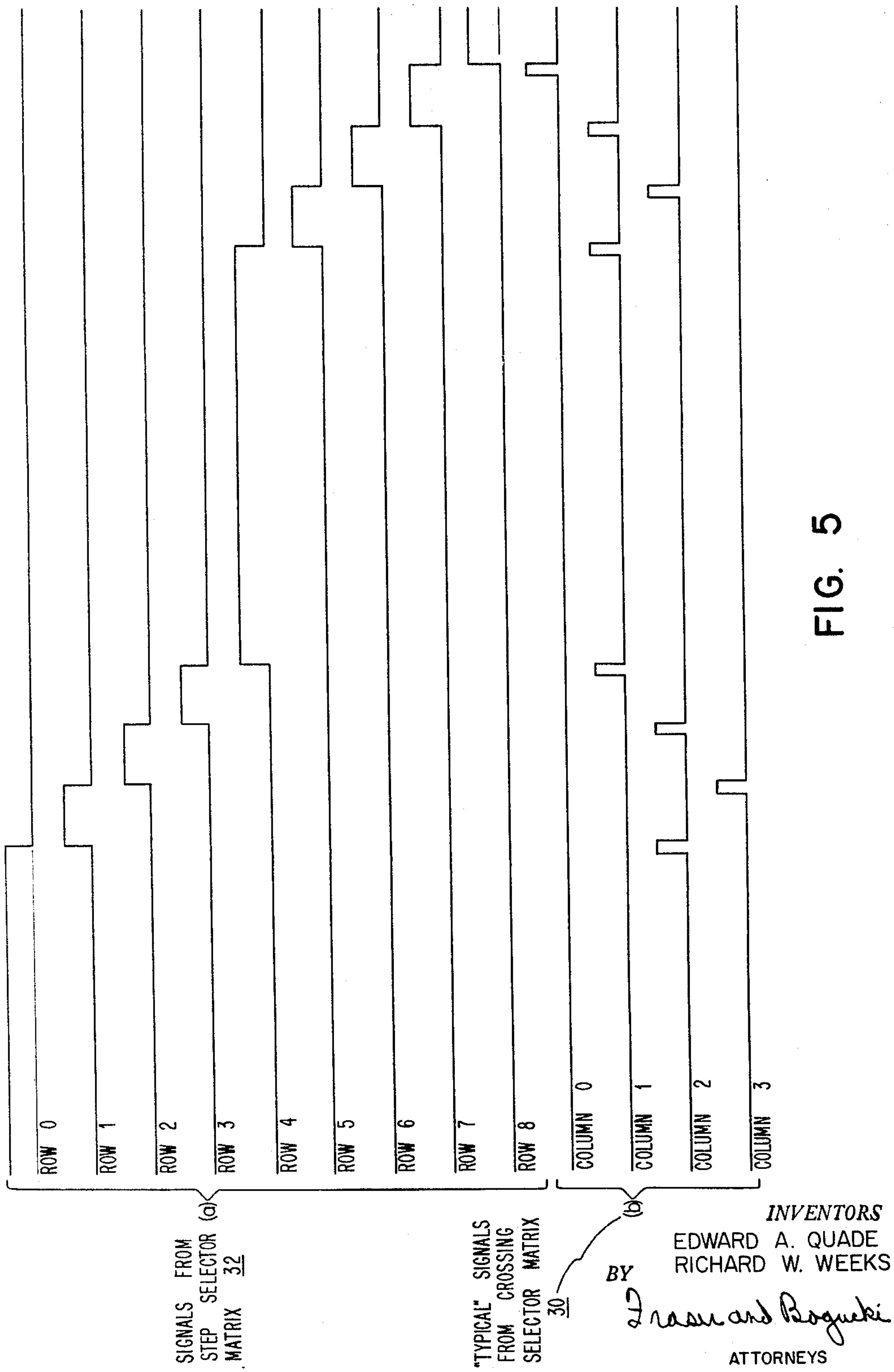
FIG. 5 is another set of graphical illustrations of various electrical signals appearing in the apparatus of FIG. 3.

Pulses from the buffer storage store pulse trigger 33 (SSMV) are passed by the store "AND" gate 29 when the "AND" gate 29 is conditioned by the output of the registration control trigger 15 and the output from a four line "AND" gate 34. The fast sweep counter "AND" gate 28 is conditioned by the registration control trigger 15 so as to pass the fast sweep trigger pulses to the three position binary line counter 19 corresponding to the four successive scanning lines succeeding the first line in which an intersection is found, i.e. the registration line. The four line "AND" gate 34 provides an output signal in response to the position of the line counter 19 so that the fast sweep "AND" gate 28 is conditioned to pass each of the four fast sweep flyback pulses mentioned above. Furthermore, the output signal from the four line "AND" gate 34 conditions the store "AND" gate 29 so that four successive store pulses from the buffer store pulse trigger 33 are passed to the crossings selector diode matrix 30. The signal from the four line "AND" gate 34 is shown in FIG. 4(*l*), the pulses passed by the fast sweep "AND" gate 28 are shown in FIG. 4(*m*), and the four store pulses passed by the "AND" gate 29 are shown in FIG. 4(*n*). The row connection signals from the step selector diode matrix 32 are shown for a first eight of the row connections in FIG. 5(*a*), while a representative set of signals appearing on the output connections from the crossings selector diode matrix 30 are illustrated in FIG. 5(*b*).

From a comparison of the typical signals of FIG. 5(*b*) with the row connection signals of FIG. 5(*a*), it is apparent that within the first group of four scanning lines the pattern of intersections may be as follows:

| | |
|---|---|
| First line | 2 |
| Second line | 3 |
| Third line | 2 |
| Fourth line | 1 |

while in the second group of four scanning lines the pattern of intersections is as follows:

| | |
|---|---|
| First line | 1 |
| Second line | 2 |
| Third line | 1 |
| Fourth line | 0 |

The result is that the following information pattern is established in the core buffer storage matrix 31 in response to the operation of the system in conjunction with the typical signals in FIG. 5.

| | Crossings | | | |
|---|---|---|---|---|
| | 0 | 1 | 2 | 3 |
| Row No. 1 | 0 | 0 | 1 | 0 |
| Row No. 2 | 0 | 0 | 0 | 1 |
| Row No. 3 | 0 | 0 | 1 | 0 |
| Row No. 4 | 0 | 1 | 0 | 0 |
| Row No. 5 | 0 | 1 | 0 | 0 |
| Row No. 6 | 0 | 0 | 1 | 0 |
| Row No. 7 | 0 | 1 | 0 | 0 |
| Row No. 8 | 1 | 0 | 0 | 0 |

where "1" represents a magnetic core which is positioned in an "ON" condition of magnetization and "0" indicates a magnetic core which is positioned in an opposite or "OFF" condition of magnetization.

Referring again to the operation of the system of FIG. 3, it should be noted that the crossings counter 9 is reset in response to each fast sweep trigger pulse. Accordingly, the number of intersections encountered on each successive fast sweep is stored in the crossings counter 9 so that the store pulse received by the crossings selector matrix 30 from the store "AND" gate 29 energizes the appropriate column of the core buffer storage matrix 31. The next fast sweep trigger pulse resets the crossings counter 9 and steps both the five position binary step counter 18 and the line counter 19, which in turn causes the step selector 32 to energize the next row connection so that the number of intersections encountered on each successive scan is introduced into the core buffer storage unit 31.

The above described operation continues for four successive scanning lines subsequent to the registration line at which time the four line "AND" gate 34 produces a signal in response to the position of the line counter 19 which closes the fast sweep counter "AND" gate 28 as well as the store "AND" gate 29. Accordingly, only information representing intersections encountered on the four successive scans is introduced into the core buffer storage unit 31. However, the cathode ray tube scanner 2 continues to scan successive lines until the occurrence of a slow sweep flyback pulse, shown in FIG. 4(*f*), indicating that a particular scanning raster is complete. The registration control trigger 15 and the video sensing trigger 16 are each reset by the slow sweep flyback pulse and the slow flyback pulse triggers the synchronizing trigger circuit 22.

On the next occurring fast sweep flyback pulse, the complete sequence as described above is repeated. However, on each successive scanning raster, the scan angle selector 6 under the control of the five position binary step counter 18 alters the combination of fast and slow deflection waves applied to the cathode ray tube scanner 2 in such a way that a succession of scanning rasters having different angular orientations is produced as shown in FIG. 2. On each scanning raster the system operates to store in a core buffer storage matrix intersection information on four successive scaninng lines subsequent to the registration line. Thus, with eight separate scanning rasters within which information is assembled along four successive scanning lines of each raster, a total of 32 rows of core elements in the matrix 31 provides a complete registration of the desired information. When the step selector 32 reachse the last row connection, a signal is applied to set the end of character trigger 17 which provides an output signal for conditioning a readout pulse "AND" gate 35 which passes a fast sweep trigger pulse from the "AND" gate 28 to a core storage readout pulse generator (SSMV) 36. The signal from the pulse generator 36 may be applied to the storage matrix 31 in conventional fashion for deriving output signals representing the stored information. In addition, the signal from the end of character trigger 17 may be inverted by an inverter 37 for closing the end of character "AND" gate 24 at the end of each character reading operation which arrests the operation of the system. The next character to be analyzed may then be moved into position on the surface 1 with a start pulse being applied to the terminal 21 to initiate the complete sequence of operations for the analysis of the next character.

In FIGS. 6A and 6B there is shown a portion of a character recognition system in accordance with the invention corresponding to the probability matrix 12, integrating circuits 13 and error detection circuits 14 of FIG. 1. The two sheets of drawings bearing FIGS. 6A and 6B may be placed side by side with FIG. 6A to the left and 6B to the right to form one diagram which will be referred to below as FIG. 6. The apparatus of FIG. 6 receives the signal information stored within the core buffer storage unit 31 of FIG. 3 and functions to identify the particular character under analysis through an evaluation of the composite probability that the information stored in the buffer storage unit 31 represents a particular one of a set of characters which the system is capable of identifying. The character recognition circuitry of FIG. 6 includes a separate integrating amplifier for each one of the group of characters which the system is designed to recognize. Although a system in accordance with the invention may be constructed to recognize any desired number of individual characters or symbols, for simplicity of pictorial representation and description, the arrangement of FIG. 6 includes only ten such integrating amplifiers which may correspond to the decimal digits from zero through nine inclusive. Therefore, in the following description of the character recognition circuitry of FIG. 6, it is assumed that the particular system under consideration is arranged to identify and distinguish between written characters or symbols corresponding to the decimal digits zero through nine inclusive only. For example, a first D.C. amplifier 40 having a capacitor 41 connected bteween its input and output circuits functions as an integrating circuit in a signal channel corresponding to a zero decimal representation. The integrating amplifier may be reset to a condition of minimum charge on the capacitor 41 by grounding the input circuit by any suitable manual or automatic means such as a switch 42. In a similar fashion, a D.C. amplifier, a capacitor and an input circuit grounding reset arrangement is employed in each signal channel corresponding to each of the 10 decimal digits from zero through nine as shown in the arrangement of FIG. 6. In operation, the integrating amplifiers generate an output signal representing a cumulative charge established on each of the integrating capacitors which in turn represents a cumulative function of the input signals applied to the integrating amplifiers.

Information from the core buffer storage unit 31 of FIG. 3 is applied to the integrating amplifiers of FIG. 6 via a resistor matrix which individually couples each of the core elements to each of the integrating amplifiers. With a core buffer storage unit such as that illustrated in FIG. 3 having 32 rows and four colums, 128 cores are therefore individually coupled to each of the ten separate integrating amplifiers. The result is that the resistor matrix indicated generally at 43 comprises 1280 separate resistance elements. However, for simplicity of pictorial representation. FIG. 6 includes only 40 such resistors comprising the number required to couple one row of core elements of the core buffer storage unit 31 to the integrating amplifiers. However, it will be understood that each row of cores is similarly coupled to the inputs of the integrating amplifiers through individual resistance elements of like number in order to establish a current path between each individual core element and each individual integrating amplifier with a single resistance element being included in each such circuit path.

The individual resistors of the resistor matrix 43 are selected in accordance with the probability that the number of intersections encountered along each scanning line indicates the presence of a particular one of the symbols which the system is capable of recognizing. For example, where two intersections are encountered along a scanning line corresponding to row No. 1 of the buffer storage unit 31, the "2" core in row No. 1 produces an output signal which is passed to each of the integrating amplifiers via the resistors R3, R7, R11, R15, R19, R23, R27, R31, R35, R39. By selecting the value of each of the resistors so that the conductance of the circuit path represents the probability that the registered number of intersections represents the symbol or character corresponding to the integrating amplifier to which the resistor is connected, a current may be passed from the signal emitting core element through each of ten circuit paths with the amount of current in each circuit path reflecting the respective probability that the character under analysis is the symbol represented by the integrating amplifier at which the particular resistor terminates. Furthermore, by selecting the resistance values to establish a conductance in each circuit path corresponding to the logarithm of the probability, currents may be passed to each of the integrating amplifiers from each of the signal emitting cores in all of the rows of the core buffer storage unit to produce a cumulative signal at the output of each of the integrating amplifiers corresponding to the composite probability that the character under analysis as represented by the information in the core buffer storage unit represents each of the several characters or symbols which the system is capable of identifying. Accordingly, a high valued output signal from a single one of the integrating amplifiers indicates a high probability that the character under analysis is the particular character corresponding to that integrating amplifier. In contrast, where the output signals from two or more of the integrating amplifiers fall within a predetermined range, an ambiguous reading is indicated since the system is unable to determine with a sufficiently high probability that the character under analysis is a particular one of the symbols or characters which the system is capable of recognizing.

Although a relatively large number of resistance elements or other electrical circuit components having a similar function is required in the construction of the probability resistor matrix, by utilizing printed circuit construction techniques, a suitable probability matrix may be readily fabricated occupying a relatively small physical space. The values of each of the resistors in the matrix may be determined either mathematically or empirically. However, an empirical set of values may be found for any given configuration of symbols by a trial run of a large number of samples through the machine with the registrations occurring in the core buffer storage matrix being introduced into conventional computation equipment for determining the relative probabilities on a statistical basis. In practice it is believed that samples of symbols of varying graphical characteristics may be analyzed to develop a set of probability values from which a probability resistance matrix may be fabricated which is capable of distinguishing between the printed, handwritten or other graphical characters and symbols with a high degree of reliability notwithstanding variation in the configuration of each of the written characters and symbols from sample to sample. In practice the value of the resistance elements may fall within the range of the order of $10^{-4}$ mhos to $10^{-6}$ mhos.

By way of example, the resistors R1–R40 shown in FIG. 8 may have the values indicated in the following table where the system is designed to identfy the numerals 0–9:

| | Ohms |
|---|---|
| R1 | 22,000 |
| R2 | 21,000 |
| R3 | 22,200 |
| R4 | 21,000 |
| R5 | 18,600 |
| R6 | 28,000 |
| R7 | 20,000 |
| R8 | 19,200 |
| R9 | 22,200 |
| R10 | 41,600 |
| R11 | ∞ |
| R12 | 10,200 |
| R13 | 10,600 |
| R14 | 10,200 |
| R15 | 15,200 |
| R16 | 22,200 |
| R17 | 41,600 |
| R18 | ∞ |
| R19 | ∞ |
| R20 | 20,000 |
| R21 | 10,200 |
| R22 | 66,700 |
| R23 | 17,400 |
| R24 | ∞ |
| R25 | 11,800 |
| R26 | 10,200 |
| R27 | 13,000 |
| R28 | 10,200 |
| R29 | 10,400 |
| R30 | 10,200 |
| R31 | ∞ |
| R32 | ∞ |
| R33 | 33,300 |
| R34 | 41,600 |
| R35 | 15,000 |
| R36 | 66,700 |
| R37 | 11,400 |
| R38 | ∞ |
| R39 | 23,600 |
| R40 | ∞ |

However, it will be appreciated that the selected value of the resistors is dependent upon the particular style of the character being identified and will vary in accordance with the statistical information associated therewith. Whenever the symbol ∞ appears in the above table, the value of the resistor is substantially infinite so that an open circuit suffices in place of the resistor. Therefore, R11, R18, R19, R24, R31, R32, R38 and R40 may be omitted from the matrix in the example given.

In the terminology of probability theory, the resistors may each represent the logarithm of the conditional probability occurrence of the statistic $A_k$ given the occurrence of the character $Cm$. That is, $$P(A_k/Cm)$$

In the system described in detail, however, the statistic $A_k$ corresponds to the number of intersections encountered along a given scanning line and the character $Cm$ corresponds to one of the numerals 0–9. On a quantitative basis, the actual probability that the scanned character is any particular character can be calculated using Bayes theorem of conditional probability. The theorem states that the probability of occurrence of a particular character $Cm$, if statistic $A_k$ has occurred is the conditional probability $P(A_k/Cm)$ described above, divided by the probability of occurrence of statistic $A_k$ for the system. This last probability, $P(A_k)$, can be calculated easily, it is merely the sum of all the conditional probabilities $A_k$. Mathematically that is $$P(Cm/A_k)=\frac{P(A_k/Cm}{P(A_k)}=\frac{P(A_k/Cm)}{\sum_{m=0}^{9}P(A_k/Cm)}$$

The probability of separate things occurring simultaneously is the product of occurrence of event 1 times the probability of occurrence of event 2, times the probability of occurrence of event 3, . . . times the probability of occurrence of event $n$. Strictly speaking, this is rigorously true in a mathematical sense only if the occurrence of the various events are independent of one another. This property is assumed to apply to the various scan lines.

For the case involved here, assume some unknown character has been scanned and on each scan line some number of intersections was encountered. For scan #1, ten conditional probabilities can be computed, one for each character.

$$P(0/A_{k1}),\ P(1/A_{k1}),\ P(2/A_{k1}),\ .\ .\ .\ ,\ P(9/A_{k1})$$

This same computation can be performed for scan #2, scan #3, etc., scan #$n$. Scan #2 computation, for example, would be:

$$P(0/A_{k2}),\ P(1/A_{k2}),\ P(2/A_{k2}),\ .\ .\ .\ ,\ P(9/A_{k2})$$

From these N sets of conditional probabilities the probability that the unknown character is any particular character can be calculated. By referring to the paragraph before last, these ten probabilities are:

$$P(0)=P(0/A_{k1})\times P(0/A_{k2})\times P(0/A_{k3})\times\ .\ .\ .\ \times P(0/A_{kN})$$

$$P(1)=P(1/A_{k1})\times P(1/A_{k2})\times P(1/A_{k3})\times\ .\ .\ .\ \times P(1/A_{kN})$$

$$\vdots$$

$$P(9)=P(9/A_{k1})\times P(9/A_{k2})\times P(9/A_{k3})\times\ .\ .\ .\ \times P(9/A_{kN})$$

By merely determining which of the ten probabilities, P(0), P(1), . . . P(9), is the largest, the most likely character is determined.

In the actual determination of these ten probabilities, P(0), P(1), . . . P(9), it is more convenient, both to instrument and to simulate on a computer, to obtain the logarithm of the probabilities. As an example, consider the computation of $$\text{Log } P(0)=\text{Log}[P(0/A_{k1})\ P(0/A_{k2})\ .\ .\ .\ P(0/A_{kN})]$$

or $$\text{Log } P(0)=\text{Log } P(0/A_{k1})+\text{Log } P(0/A_{k2})+\ .\ .\ .\ +\text{Log } P(0/A_{kN})$$

The most likely character is then selected on the basis of which logarithm is the largest.

In the arrangement of FIG. 3, a readout pulse from the readout pulse generator 36 is applied to a connection which threads all of the cores of the core storage matrix 31 in series so that when the readout pulse occurs it simultaneously resets all the core elements that have been set during a scanning operation to produce output pulses which are passed to the integrating amplifiers of FIG. 6 by the resistance elements of the probability matrix 43.

The output signals from all of the integrating amplifiers are applied to an averaging amplifier 44 in the arrangement of FIG. 6 via individual resistance elements such as the resistor 45 associated with the integrating amplifier 40 in the "zero" channel. The averaging amplifier 44 provides a signal representing the average of the output signals from the integrating amplifiers which is individually subtracted from each of the output signals by application of the averaged signal to the input of separate difference amplifiers associated with each of the symbol channels. Thus, for example, the averaged output signal from the average amplifier 44 is applied to a difference amplifier 46 via a resistor 47 in the zero channel. Since the amplifier 46 receives the output signal from the integrating amplifier 40 via a resistor 48, a signal appears at the output of the difference amplifier 46 representing a comparison between the output signal from the integrating amplifier and the averaged output signal.

In a similar fashion, a difference amplifier is included in each of the separate channels for deriving an output signal representing a comparison between the output signal from each of the integrating amplifiers and the averaged signal. Whenever an integrating amplifier output signal is sufficiently above the averaged signal, a signal is produced at the output of the corresponding difference amplifiers which triggers a level detector circuit which may comprise a conventional Schmitt trigger arrangement. Accordingly, for example, the signal output from the difference amplifier 46 in the "zero" channel is applied to a Schmitt trigger circuit 49 which is actuated whenever a comparison between the signal output of the "zero" integrating amplifier rises above the averaged output signal by a predetermined amount. The threshold required to trigger the level detector may be adjusted by means of a variable resistor 50 connected between the output and input of the difference amplifier 46. In a similar fashion, a difference amplifier, a Schmitt trigger and an adjustable threshold are included in each channel. The output signals from each of the individual level detectors are combined for application to a reject signal amplifier 51, as for example, by means of a resistor 52 connected between the level detector 49 and the reject amplifier 51. The amplifier 51 develops an output signal which is applied to two separate Schmitt trigger circuits 53 and 54. The Schmitt trigger circuit 54 is actuated whenever one or more of the level detector Schmitt triggers 53 is actuated whenever two or more of the level detector Schmitt triggers are actuated. In the absence of the actuation of any of the level detector circuits, neither of the Schmitt trigger circuits 53 or 54 provides an output signal and a normally open threshold "AND" gate 55 passes a pulse derived from a print pulse signal generator (SSMV) 56 to an output "OR" circuit 57 as a reject signal, thereby indicating either an ambiguous readout, a blank, or a symbol which is incapable of recognition by the system.

In contrast, where one only of the level detector circuits is energized, the Schmitt trigger 54 is actuated to apply a pulse to the threshold "AND" gate 55 via an inverter 58 which blocks the passage of the print pulse to the reject "OR" gate 57. Furthermore, the actuated level detector circuit conditions its associated output "AND" gate to pass a pulse from the print pulse generator 56 via a normally open print "AND" gate 59. Thus, for example, where the "zero" level detector 49 is energized, a signal is passed by a zero "AND" gate 60, thereby indicating the recognition of a zero symbol. Similarly, each of the other "AND" output gates is conditioned to pass an output signal whenever a symbol under analysis corresponds to the particular symbol represented thereby.

An additional error checking feature in accordance with the invention is included in the system of FIG. 6 in which the Schmitt trigger circuit 53 responds to the signal from the reject amplifier 51 whenever two or more of the level detectors are actuated. It will be recognized that whenever more than one of the level detectors is actuated an ambiguous reading is indicated since the system cannot distinguish as to whether the symbol under analysis is one particular symbol or another. Whenever the Schmitt trigger circuit 53 is actuated, a signal is applied to the print "AND" circuit 59 via an inverter 61 which closes the print "AND" gate 59 so that no pulse appears at the output of any of the output "AND" gates.

Furthermore, the print pulse from the print pulse generator 56 is passed to the reject "OR" gate 57 via the reject "AND" gate 62 so that there is provided a reject signal in place of an output signal, thereby indicating an ambiguouos reading. With respect to the timing of the signals in the above arrangement, the conditioning of each of the several "AND" gates takes place during the core storage readout pulse generated by the pulse generator 36 of FIG. 3 as represented in FIG. 7($h$). The print pulse from the print pulse generator 56 is energized by the trailing edge of the readout pulse so as to insure the prior conditioning of each of the several output gates in order that the print pulse may be passed by a selected one only of the "AND" output gates in the case of a correct reading or in the alternative via the reject "OR" gate 57 in the event of a blank or ambiguous reading.

FIG. 7 comprises a set of graphical illustrations showing the relationship between a number of the signals described above over a complete scanning cycle. Thus, FIG. 7($a$) represents the start pulse applied to the terminal 21, FIG. 7($b$) represents the fast sweep trigger pulses generated by the fast sweep generator 5A of FIG. 3, FIG. 7($c$) represents the slow sweep deflection wave provided by the slow sweep generator 5B, and FIG. 7($d$) illustrates the slow sweep flyback pulses which are synchronized with the slow sweep deflection wave. Extended length pulses from the synchronizing trigger circuit 22 are shown in FIG. 7($e$), with the slow sweep trigger pulses being shown in FIG. 7($f$). The signal from the end of character trigger 17 is shown in FIG. 7($g$), with the core buffer readout pulse produced by the pulse generator 36 being shown in FIG. 7($h$). In response to the core buffer readout pulse from the pulse generator 36, a print pulse shown in FIG. 7($i$) is produced as described above in connection with FIG. 6.

FIG. 8 is a schematic circuit diagram of an arrangement for performing the function of the scan angle selector 6 of FIG. 3. The scan angle selection circuit of FIG. 8 operates to combine fast sweep deflection waves and slow sweep deflection waves to provide a composite deflection wave which when applied to the deflection plates of a cathode ray tube causes a raster of scanning lines to be generated at predetermined angular positions as shown in FIG. 2. For maximum flexibility, two separate scan angle selection circuits corresponding to FIG. 8 may be employed so as to generate two separate composite deflection waves for application to the horizontal and vertical deflection plates of a cathode ray tube respectively.

In FIG. 8, fast sweep deflection waves may be applied to the base of a transistor 72 via a terminal 70 and slow sweep deflection waves may be applied to the base of a transistor 73 via a terminal 71. Between the collector of the transistor 72 and a source of operating potential represented by a terminal 73 may be connected four separate adjustable potentiometers 74, 75, 76 and 77 in parallel. Each of the potentiometers 74–77 is individually adjustable to apply a fast sweep deflection wave of a selected amplitude to the contacts 5–8 of a selector switch 78. In a similar fashion, four separately adjustable potentiometers 79, 80, 81 and 82 are connected in parallel between the emitter of the transistor 72 and ground reference potential. By suitable adjustment of the potentiometers 79–82 selected amplitudes of fast sweep deflection waves may be applied to the terminals 1–4 of the switch 78 in a phase which is opposite to that of the phase of the waves applied to the terminals 5–8. Thus, by a positioning of the switch 78 a fast sweep deflection wave of either phase and of a selected preset amplitude may be passed to a signal mixing circuit via a resistor 83.

The circuit for selecting the amplitude and phase of the slow sweep deflection wave is identical to that described above in connection with the fast sweep deflection wave selection circuit except that a selector switch 84 is employed in which the contact order is reversed from that of the switch 78. Thus, with deflection waves applied to the terminals 70, 71 of the same phase, and assuming that the switches 78 and 80 are ganged together, the switch 84 passes a slow sweep deflection wave to the mixing circuit via a resistor 85 having a phase opposite to that of the wave passed via the switch 78.

By means of a voltage divider comprising eight individually adjustable potentiometers 86–89 and 90–93 connected between positive and negative supply terminals 94 and 95 there may be derived a biasing voltage of a selected magnitude and of either polarity via a switch 96 for application to the mixing circuit via a resistor 97. The adjustable biasing voltages function to position the raster generated by the cathode ray tube at a selected position so that as different combinations of fast and slow sweep deflection waves are selected corresponding to different angular positioned rasters, the central portion of the raster encompasses the region in which a character to be scanned is located.

The three signals passed by the resistors 83, 85 and 97 are applied to the emitter of a mixing transistor 98 which receives an emitter bias voltage from a voltage supply terminal 99 via an adjustable resistor 100. Operating voltage is applied to the collector of the mixing transistor 98 from a voltage supply terminal 101 via a collector resistor 102. The composite deflection wave from the transistor 98 is applied to a deflection wave amplifier 103 containing a selected portion of the fast sweep deflection wave, a selected portion of the slow sweep deflection wave, and a selected biasing voltage. As noted above, two separate arrangements similar to FIG. 8 may be employed with the output signal from the deflection wave amplifier 103 of each being applied to separate deflection plates of the cathode ray tube to generate a raster of scanning lines at a selected angular position. Each of the switches 78, 84 and 96 of the arrangement of FIG. 8 may comprise automatic switching devices such as stepping switches or electronic commutation arrangements for generating each of the angularly related scanning rasters in succession. Therefore, in effect, the system of FIG. 3 functions to generate a rotating raster for deriving the statistical information required to identify the characters or symbols under observation.

Although there has been described above a system which is specially adapted to identify written characters, the apparatus of the invention may also be employed to individually identify each one of a class of things from which suitable statistical information may be derived relating to any desired phenomena or manifestation. Accordingly, the particular system described in detail above is intended to be by way of example only and the invention should be considered to encompass any and all modifications, alternative structures or equivalent arrangements falling within the scope of the annexed claims.

What is claimed is:

1. A recognition system including the combination of means for deriving statistical information from a thing to be identified, means generating an electrical signal in response to the derived statistical information, a probability determining circuit coupled to said signal generating means, said probability determining circuit comprising a matrix of elements each having an electrical characteristic corresponding to the probability that the electrical signal represents one of a plurality of things, a plurality of output circuits coupled to said matrix, each corresponding to one of said plurality of things, and accumulator means coupled between the matrix and the output circuit for providing output signals indicative of the probability that the derived statistical information represents a particular one of said plurality of things based upon a composite probability derived by said accumulator means in response to electrical signals passed by said matrix.

2. A recognition system including the combination of means for deriving statistical information from a thing to be identified, means for generating an electrical signal corresponding to the derived statistical information, a probability determining circuit coupled to said signal generating means, said probability determining circuit comprising a matrix of elements each having an electrical characteristic corresponding to the probability that an electrical signal represents one of a plurality of things, accumulator means coupled to the matrix for providing output signals indicative of the probability that the derived statistical information represents a particular one of said plurality of things based upon a composite probability derived by said accumulator means in response to electrical signals passed by said matrix representing said derived statistical information, and means deriving a selected one of the output signals from the accumulator means having the highest probability that the derived statistical information represents a particular one of said plurality of things.

3. A recognition system for identifying individual ones of a class of things from which statistical identifying information may be derived including the combination of means generating electrical signals representing a thing to be identified, a statistical probability determining circuit coupled to said signal generating means, said statistical probability determining circuit comprising a matrix of elements each having an electrical conductivity corresponding to the logarithm of the probability that the electrical signal represents one of said plurality of things, a plurality of accumulator devices one of which corresponds to each of said plurality of things coupled to said matrix for receiving electrical signals passed by said matrix elements and a plurality of individual output circuits coupled to said accumulator devices for providing output signals indicative of the composite probability that the thing to be identified represents a particular one of said plurality of things.

4. A recognition system for identifying each of a plurality of individual things including the combination of means generating electrical signals in response to the particular thing to be identified, a probability determining circuit coupled to said signal generating means, said probability determining circuit comprising a matrix of elements each having an electrical conductivity corresponding to the logarithm of the probability that the electrical signal represents one of said plurality of things, a plurality of accumulator devices one of which corresponds to each of said plurality of things coupled to said matrix for receiving electrical signals passed by said matrix elements, a plurality of individual output circuits coupled to said accumulator devices for providing output signals indicative of the composite probability that the thing to be identified represents a particular one of said plurality of things, and means for comparing said output signals to detect the appearance of a single one of said output signals indicating a composite probability that the thing to be identified is a particular one of said plurality of things.

5. Apparatus in accordance with claim 4 including an error detection circuit coupled to said output circuits for generating an error signal whenever the composite probabilities represented by two or more of said output signals fall within a predetermined range.

6. A character identification system including the combination of means for progressively scanning a character to be identified with each of a plurality of angularly related scanning patterns, said scanning means being operative to scan each character to be identified with each of said plurality of angularly related scanning patterns, means generating an electrical signal in response to the scanning of said character by said scanning means in each of said plurality of angularly related scanning patterns, a character recognition circuit coupled to said signal generating means, said character recognition circuit comprising a matrix of elements each having an electrical characteristic corresponding to the probability that the electrical signal generated during the progressive scanning of each character to be identified with each of said plurality of angularly related scanning patterns represents one of a plurality of characters, and means coupled to said matrix for developing an output signal indicative of the probability that the electrical signal represents a particular one of said plurality of characters.

7. A character reading system including the combination of means for progressively scanning a character to be read with each of a plurality of angularly related scanning patterns, said scanning means being operative to scan each character to be read with each of said plurality of angularly related scanning patterns in sequence means generating an electrical signal in response to each crossing of the character by said scanning means during the scanning of the character sequentially with each of said plurality of angularly related scanning patterns, a character recognition circuit coupled to said signal generating means, said character recognition circuit comprising a matrix of elements each having an electrical characteristic corresponding to the probability that the electrical signal during the scanning with each of said plurality of angularly related scanning patterns in sequence represents one of a plurality of characters, and means coupled to said matrix for developing an output signal indicative of the probability that the electrical signal represents a particular one of said plurality of characters.

8. A character identification system including the combination of means for progressively scanning a character to be identified with each of a plurality of angularly related scanning patterns, means generating an electrical signal in response to the number of crossings encountered in each of said plurality of angularly related scanning patterns, a character recognition circuit coupled to said signal generating means, said character recognition circuit comprising a matrix of elements each having an electrical characteristic corresponding to the probability that the electrical signal produced on each successive scan represents one of a plurality of characters, a plurality of output circuits coupled to said matrix each corresponding to one of said plurality of characters, and accumulator means coupled between the matrix and the output circuits for providing output signals indicative of the probability that the character scanned represents a particular one of said plurality of characters based upon a composite probability derived by said accumulator means in response to electrical signals passed by said matrix.

9. A character identification system including the combination of means for scanning a character to be identified with a plurality of angularly related scanning rasters each of which comprises a plurality of separate scanning lines, means generating an electrical signal in response to a crossing of a portion of the character by each scanning line, means coupled to said electrical signal generating means for counting the number of crossings encountered in each individual scanning line, a character recognition circuit coupled to said counting means, said character recognition circuit comprising a matrix of elements each having an electrical characteristic corresponding to the probability that the number of crossings produced on each successive scanning line represents one of the plurality of characters, and accumulator means coupled to matrix for providing a spearate output signal for each of said plurality of characters indicative of the probability that the character scanned represents a particular one of said plurality of characters based upon a composite probability derived by said accumulator means in response to electrical signals passed by said matrix.

10. A character identification system including the combination of means for generating a raster of scanning lines, means for causing said raster generating means to produce a plurality of separate scanning rasters which comprise scanning lines which are angularly related with respect to scanning lines of others of said rasters, means impressing each of said rasters on a character to be identified, means generating an electrical signal in response to the crossing of a portion of a character to be identified by each of the individual scanning lines of each of said angularly related rasters, a character recognition circuit coupled to said signal generating means, said character recognition circuit comprising a matrix of elements each having an electrical characteristic corresponding to the probability that an electrical signal produced on each successive scan represents one of a plurality of characters, accumulator means coupled to the matrix for providing output signals indicative of the probability that the character scanned represents a particular one of said plurality of characters based upon a composite probability derived by said accumulator means in response to electrical signals passed by said matrix representing the number of character crossings encountered in each individual scanning line, and means deriving a selected one of the output signals from the accumulator means having the highest probability that the character scanned represents the particular one of said plurality of characters which the derived output signal represents.

11. A character identification system including the combination of means for generating a plurality of differently oriented scanning patterns each of which comprises a plurality of individual scanning lines, means impressing said scanning patterns upon a character to be identified, means generating an electrical signal in response to each intersection of an individual scanning line with a portion of said character, a crossings counter coupled to said electrical signal generating means for providing a registration of the number of intersections with a portion of a character encountered in each successive scanning line, a character recognition circuit coupled to said crossings counter, said character recognition circuit comprising a matrix of elements each having an electrical characteristic corresponding to the probability that a predetermined number of crossings produced on each successive scan represents one of a plurality of characters, means responsive to the registration in said crossings counter for passing currents to selected ones of the elements of said matrix in accordance with the number of crossings encountered on each successive scan, and a plurality of accumulator devices one of which corresponds to each of said plurality of characters coupled to the matrix for receiving electrical signals having a magnitude determined by the electrical characteristics of the elements of the matrix and a plurality of output circuits coupled to corresponding ones of said plurality of accumulator devices for providing output signals indicative of the probability that the character scanned represents a particular one of said plurality of characters based upon a composite probability derived by said accumulator means in response to electrical signals passed by said matrix.

12. A character identification system in which a character to be identified is scanned by a raster of scanning lines which is rotatable with respect to a fixed axis to produce a plurality of angularly related scanning patterns including the combination of means generating electrical signals in response to each intersection between a scanning line and a portion of a character to be identified, a character recognition circuit coupled to said signal generating means, said character recognition circuit comprising a matrix of elements each having an electrical conductivity corresponding to the logarithm of the probability that the electrical signal produced on each successive scan represents one of a plurality of characters, a plurality of accumulator devices one of which corresponds to each of said plurality of characters coupled to said matrix for receiving electrical signals passed by said matrix elements, and a plurality of individual output circuits coupled to said accumulator devices for providing output signals indicative of the composite probability that the character scanned represents a particular one of said plurality of characters.

13. A character identification system in which a character to be identified is scanned by a raster of scanning lines which is rotatable with respect to a fixed axis to produce a plurality of angularly related scanning patterns including the combination of means generating electrical signals in response to each intersection between a scanning line and a portion of a character to be identified, a character recognition circuit coupled to said signal generating means, said character recognition circuit comprising a matrix of elements each having an electrical conductivity corresponding to the logarithm of the probability that the electrical signal produced on each successive scan represents one of a plurality of characters, a plurality of accumulator devices one of which corresponds to each of said plurality of characters coupled to said matrix for receiving electrical signals passed by said matrix elements, a plurality of individual output circuits coupled to said accumulator devices for providing output signals indicative of the composite probability that the character scanned represents a particular one of said plurality of characters, and means for selecting a particular one of said output signals to identify the character being scanned in accordance with the appearance of a single one of said output signals indicating a composite probability which is substantially higher than the composite probability of each of said other output signals.

14. Apparatus in accordance with claim 13 including an error detection circuit coupled to said output circuits for generating an error signal whenever the composite probabilities represented by two or more of said output signals fall within a predetermined range.

References Cited

UNITED STATES PATENTS

| | | | |
|---|---|---|---|
| 2,615,992 | 10/1952 | Flory et al. | 250—219 |
| 2,894,247 | 7/1959 | Relis | 340—149.1 |
| 2,919,426 | 12/1959 | Rohland | 340—149.1 |
| 2,933,246 | 4/1960 | Rabinow | 340—149.1 |
| 2,924,812 | 2/1960 | Merritt et al. | 340—146.3 |
| 2,935,619 | 7/1960 | Rogers | 235—61.11 |
| 2,947,971 | 8/1960 | Glauberman et al. | 235—61.11 |
| 2,978,675 | 4/1961 | Highleyman | 340—146.3 |

MAYNARD R. WILBUR, *Primary Examiner.*

NEIL C. READ, *Examiner.*

G. E. MEYERS, *Assistant Examiner.*